(12) United States Patent
Verkler

(10) Patent No.: US 9,101,153 B2
(45) Date of Patent: Aug. 11, 2015

(54) PEARL SUGAR PARTICLE, COMPOSITION, AND PROCESS FOR PREPARING A PEARL SUGAR

(75) Inventor: David Verkler, Lake Forest, IL (US)

(73) Assignee: Bonique Corp., Lake Forest, IL (US)

( * ) Notice: Subject to any disclaimer, the term of this patent is extended or adjusted under 35 U.S.C. 154(b) by 0 days.

(21) Appl. No.: 13/542,978

(22) Filed: Jul. 6, 2012

(65) Prior Publication Data

US 2014/0011892 A1    Jan. 9, 2014

(51) Int. Cl.
| | | |
|---|---|---|
| *A61K 47/26* | (2006.01) | |
| *A23L 1/09* | (2006.01) | |
| *A23L 1/00* | (2006.01) | |
| *A23L 1/221* | (2006.01) | |

(52) U.S. Cl.
CPC ............... *A23L 1/0017* (2013.01); *A23L 1/09* (2013.01); *A23L 1/221* (2013.01)

(58) Field of Classification Search
USPC ................ 424/439; 426/285, 660; 127/60
See application file for complete search history.

(56) References Cited

U.S. PATENT DOCUMENTS

| | | | | |
|---|---|---|---|---|
| 2,019,365 | A * | 10/1935 | Speed .............................. | 127/30 |
| 2009/0017167 | A1 * | 1/2009 | Krumhar et al. ................ | 426/72 |

FOREIGN PATENT DOCUMENTS

| | | | | |
|---|---|---|---|---|
| EP | 0 554 231 B1 | 6/1996 | | |
| EP | 2 100 519 A1 | 9/2009 | | |
| EP | 2100519 A1 * | 9/2009 | .............. | A23L 1/236 |

OTHER PUBLICATIONS

Moore, Earlene: "Earlene's Cakes: Individual Pearls for your cakes." Retrieved from the Internet: URL:http://web.archive.org/web/20100103151727/http://earlenescakes.com/prlinstruct.htm [retrieved on May 13, 2013] (4 pages).
A European Style Waffle. (this stuff is lush), Retrieved from the Internet: URL:http://www.instructables.com/id/A-European-Style-Waffle.-this-stuff-is-lush/step4/Beaded-or-pearl-sugar/ [retrieved on May 13, 2013] (4 pages).
"Pearl Sugar" Retrieved from the Internet: URL:http://www.coupletsugars.com/content.php?langue+english&cle_menus=1176970979 (1 page).
"New: Water Resistant Coated Pearl Sugar" Retrieved from the Internet: URL:http://www.coupletsugars.com/page/coated%20sugar@20carrare/f1.html (1 page).
"Coloured and Flavoured Pearl Sugar" Retrieved from the Internet: URL:http://www.coupletsugars.com/content.php? langue=english &cle_menus=1194530921 (1 page).
Commission Decision of Jan. 31, 1990 on State aid to SA Sucrerie Couplet by the European Economic Commission (EEC), Official Journal L 186, pp. 0021-0025 dated Jul. 18, 1990, Retrieved from the Internet: URL:http://www.eur-lex.europa.eu/LexUriServ/LexUriServe.do?uri=CELEX:31990D0379:EN:HTML [retrieved on May 14, 2013] (7 pages).

* cited by examiner

*Primary Examiner* — Michael B Pallay
(74) *Attorney, Agent, or Firm* — Schiff Hardin LLP

(57) ABSTRACT

A pearl sugar particle includes granulated sugar and at least one additive, wherein the at least one additive is distributed homogeneously throughout the pearl sugar particle. A composition including a plurality of pearl sugar particles and a process for preparing a pearl sugar are also disclosed.

7 Claims, No Drawings

PEARL SUGAR PARTICLE, COMPOSITION, AND PROCESS FOR PREPARING A PEARL SUGAR

BACKGROUND

The subject matter disclosed herein relates generally to a pearl sugar composition and, more particularly, to a pearl sugar composition including a plurality of pearl sugar particles, wherein each pearl sugar particle includes granulated sugar and at least one additive distributed homogeneously throughout the pearl sugar particle. The disclosed subject matter also relates to a process for making pearl sugar particles.

Pearl sugar, also known as nib sugar, has been in existence since the 18$^{th}$ century. It is a product of refined white sugar. It is very coarse, hard, opaque white, and does not melt at temperatures typically used for baking. Pearl sugar is used extensively in Scandinavian and other Northern European countries in baked goods such as pastries, cookies, cakes and buns. It is said to have originated in Liege, Belgium for use in waffles and remains the key ingredient in the "liege waffle" which is produced and sold throughout the world.

Pearl sugar is traditionally obtained from granulated sugar that has been subjected to humidification, compression, drying, and crushing and/or grinding. Next the sugar is sifted and the particles, known as "pearls," are separated from the residue of sugar granules before being polished. Pearl sugar is distinguished by its high purity and is characterized by hardness optimally obtained by the cold pressing and/or molding at high pressure followed by a very long drying process.

Pearl sugar is commonly sprinkled on top of or incorporated into baked goods. Since it does not fully melt at common baking temperatures, pearl sugar provides crunchiness and sweetness to baked goods. It is also often used as a decorative element sprinkled on top of pastries, breads and cookies.

Traditional pearl sugar is made of unflavored and uncolored granulated sugar. Pearl sugars that have been coated with flavors and colors are known and available from, for example, Sucrerie Couplet, Belgium. However, these types of products do not have an additive, color, or flavor that is distributed homogenously throughout the pearl sugar particle itself. Adding a coating to the pearl sugar particle also requires an additional manufacturing step beyond what is required to make the pearl sugar itself. In addition, the traditional pearl sugar manufacturing process is complicated by the requirement that the sugar be compressed under high pressure.

SUMMARY

In one aspect, a pearl sugar particle includes granulated sugar and at least one additive, wherein the at least one additive is distributed homogeneously throughout the pearl sugar particle.

In another aspect, a composition includes a plurality of pearl sugar particles. Each pearl sugar particle of the plurality of pearl sugar particles includes granulated sugar and at least one additive, wherein the at least one additive is distributed homogeneously throughout each pearl sugar particle.

In yet another aspect, a process for preparing a pearl sugar includes mixing granulated sugar and a liquid to form a mixture; heating the mixture to form a slurry; adding at least one additive to the slurry; cooling and drying the slurry to form a solid composition; and forming a plurality of pearl sugar particles from the solid composition, wherein the at least one additive is distributed homogeneously throughout each of the plurality of pearl sugar particles.

In yet another aspect, a process for preparing a pearl sugar includes mixing granulated sugar and a liquid to form a mixture; heating the mixture to form a slurry; cooling and drying the slurry to form a solid composition; and forming a plurality of pearl sugar particles from the solid composition.

DETAILED DESCRIPTION

Certain embodiments described herein relate to a sugar condiment including a plurality of pearl sugar particles. Each pearl sugar particle includes granulated sugar and one or more additives distributed homogeneously throughout the pearl sugar particle. In certain embodiments, the one or more additives may include one or more of the following additives: natural or artificial flavors, extracts, and/or colors.

In one embodiment, a pearl sugar particle includes granulated sugar and at least one additive distributed homogeneously throughout the pearl sugar particle. In a particular embodiment, a sugar-based composition includes a plurality of these pearl sugar particles. In another embodiment, a method or process for the preparation of a pearl sugar includes mixing granulated sugar and a liquid, such as water, to form a mixture; heating the mixture to form a slurry; cooling and drying the slurry to form a solid composition; and forming a plurality of pearl sugar particles from the solid composition. In a particular embodiment, at least one additive is added to the slurry, wherein the at least one additive is distributed homogeneously throughout each of the plurality of pearl sugar particles.

In the following description, embodiments are described in relation to a pearl sugar particle having one or more additives including, without limitation, a coloring and/or a flavoring, homogeneously distributed throughout the pearl sugar particle. This is by way of example only, it being understood that embodiments may be implemented that include any suitable additive or combination of additives to enhance the taste and/or feel of the edible product or no additive.

The distribution of the additive throughout the entire pearl sugar particle provides certain advantages. The disclosed pearl sugar particles may be easily added to baked goods without altering the existing recipes. They may be used decoratively and sprinkled on products such as breads or cookies, or they may be incorporated into the baked good itself. For example, if the additive is a flavor it permits localized and intense flavoring of baked goods. In addition, the pearl sugar particle provides a morsel of intense sweetness and flavor within a baked good without overly sweetening the whole product or masking the other subtle flavors in the product.

The intensity of the effect provided by the pearl sugar particle is increased compared to a coated pearl sugar because the additive can be incorporated throughout the entire volume of the pearl sugar particle, not just at the surface. For example, if the additive is a flavor homogeneously distributed throughout the pearl itself, this allows for a more intense flavoring of the baked good. Also, the homogenous distribution of the additive is advantageous because there is no concern that the additive may be separated from the pearl sugar particle. This could be a concern in a product in which the additive is a layer deposited on the surface of the sugar particle. During packaging, shipping, storage and/or use, the coating may crack or break off of the pearl sugar diminishing its usefulness and the aesthetics of its appearance.

The instant pearl sugar particles also have the advantage of a simple manufacturing process. Traditional pearl sugars are made by compressing sugar at high pressures. In addition, the commercially available coated pearl sugars must be made by adding an additional manufacturing step, such as spray coating, to apply the color coating or the flavor coating. The manufacturing processes for the pearl sugar particles as described herein do not require compression. Further, the manufacturing processes as described herein do not require an additional coating step. The instant pearl sugar particles are made using a simple process in which the ingredients are mixed with a liquid, such as water, heated, cooled, delumped, dried, and separated by size. No compression is required. In addition, the additive is incorporated into the manufacture of the pearl sugar particle itself. No extra step is required, resulting in a more economical and efficient manufacturing process.

In certain embodiments, the pearl sugar particles include granulated sugar and at least one additive. As described herein, the at least one additive is distributed homogeneously throughout the pearl sugar particle. The pearl sugar particle may, optionally, also include a suitable fine sugar such as, for example, a superfine or baker's sugar. In one embodiment, a weight ratio of granulated sugar to fine sugar is between 0.25 and 4.0 or, more specifically, between 1.0 and 2.0, or, even more specifically, 1.5.

As used herein the term "additive" may be any substance that provides a desired characteristic to the pearl sugar particle. Additives may be in the form of liquids or solids and may impart, for example, particular flavors or colors to the pearl sugar particle. Additives include, but are not limited to, natural or artificial flavors, extracts, and colors. There are thousands of possible flavor, extract, and color additives that could be incorporated into the pearl sugar particle. Such additives are commonly available from various commercial suppliers. By way of nonlimiting examples, suitable additives may include one or more ingredients commonly used in baking to impart desired flavors and/or colors, for example, such as cinnamon, mint, chocolate, food coloring, liqueurs, and spirits such as rum and brandy. Additives may also include extracts derived from, for example, maple, vanilla, almond, coconut, lemon, orange, cherry, anise, mint, and peppermint. Additives may also include freeze-dried food products and ground food products, such as freeze-dried or ground fruits, meats and vegetables.

In an alternative embodiment, the additive may also include medications or other supplements intended to enhance or support the health of the consumer. For example, over the counter or prescription medications may be incorporated into the pearl sugar particle. This alternative embodiment may expand the possible dosing mechanisms for certain medications or supplements. The sweetness of the pearl sugar particle may make the medication more palatable to the consumer.

In one embodiment, a method or process for preparing the disclosed pearl sugar particles includes:

(1) mixing granulated sugar and liquid to form a mixture;
(2) heating the mixture to form a slurry;
(3) cooling and drying the slurry to form a solid composition; and
(4) forming a plurality of pearl sugar particles from the solid composition.

In this embodiment, the liquid used in this process is water. However, a wide variety of other liquids may be used in alternative embodiments to provide desired properties. For example, in various embodiments the liquid may include one or more of the following: tea, coffee, fruit juice, vegetable juice, and water. In a particular embodiment, at least one additive is added to and mixed into the slurry. By using this process, the at least one additive is distributed homogeneously throughout each pearl sugar particle.

In one embodiment, steps (1) and (2), including the optional addition of at least one additive, are carried out in a pan or firemixer. The weight ratio of granulated sugar to liquid is between 1.0 and 10, or, more specifically, 6.0. In one embodiment, the slurry is heated to between 125 and 250 degrees F., or, more specifically, to between 220 and 240 degrees F. or, even more specifically, to 230 degrees F. The granulated sugar and liquid mixture is heated to increase the saturation point of the sugar and liquid mixture. The heat is then removed and at least one additive may be incorporated into the slurry by mixing. In a particular embodiment, at this point in the process, a superfine or baker's sugar is also added to the slurry and mixed into the slurry. The resulting slurry is poured onto a baking sheet or tray and allowed to cool until a hard sheet of pearl sugar composition is formed. In one embodiment, the slurry is allowed to cool for approximately 24 hours. The sheet is then broken up in a delumper or other suitable machine, or using another suitable process. The delumped sugar particles are dried on a mesh rack. Potential drying methods include, without limitation, air drying the delumped sugar particles over several days, dehumidifying the delumped sugar particles, drying the delumped sugar particles under infrared heater, or drying the delumped sugar particles under a fan in a controlled environment. The dried sugar particles can then be separated by size through well-known screening or sieve techniques. The disclosed process results in irregularly shaped particles that range in size from 0.5 millimeters (mm) to 13 mm. The particles that are larger than 3.2 mm may be polished in a canvas lined revolving polishing pan or by other known techniques.

The following nonlimiting examples are illustrative of certain embodiments, and are not to be construed as limiting the disclosure, the scope of which is defined by the appended claims.

EXAMPLE 1

Cinnamon Pearl Sugar Particle

In a baking pan, 690 grams (g) of granulated sugar was mixed with 115 g of water. The resulting mixture was heated to 230 degrees F. The heat was turned off. One and a half tablespoons of ground cinnamon was added to the mixture and stirred until well dispersed. 460 g of baker's sugar was then added to and mixed rapidly into the mixture. The resulting slurry was poured into a baking sheet and allowed to cool for 24 hours to form a hard sheet. The sheet was broken up in a delumper. The delumped sugar particles were air dried over several days. The dried sugar particles were then screened and separated by size. The particles larger than 3.2 mm were polished in a canvas lined revolving polishing pan.

EXAMPLE 2

Maple Pearl Sugar Particle

In a baking pan, 690 g of granulated sugar was mixed with 115 g of water. The resulting mixture was heated to 230 degrees F. The heat was turned off. One half tablespoon of maple extract was added to the mixture and stirred until well dispersed. 460 g of baker's sugar was then added to and mixed rapidly into the mixture. The resulting slurry was poured into a baking sheet and allowed to cool for 24 hours to form a hard sheet. The sheet was broken up in a delumper. The delumped sugar particles were air dried over several days. The dried sugar particles were then screened and separated by size. The particles larger than 3.2 mm were polished in a canvas lined revolving polishing pan.

EXAMPLE 3

Mint Pearl Sugar Particle

In a baking pan, 690 g of granulated sugar was mixed with 115 g of water. The resulting mixture was heated to 230 degrees F. The heat was turned off. Three tablespoons of mint extract, 5 drops of green food coloring and 1 drop of yellow food coloring were added to the mixture and stirred until well dispersed. 460 g of baker's sugar was then added to and mixed rapidly into the mixture. The resulting slurry was poured into a baking sheet and allowed to cool for 24 hours to form a hard sheet. The sheet was broken up in a delumper. The delumped sugar particles were air dried over several days. The dried sugar particles were then screened and separated by size. The particles larger than 3.2 mm were polished in a canvas lined revolving polishing pan.

The described compositions and methods are not limited to the specific embodiments described herein. In addition, components of each composition and/or steps of each method may be practiced independent and separate from other components and method steps, respectively, described herein. Each component and method also can be used in combination with other compositions and methods.

This written description uses examples to disclose certain embodiments, including the best mode, and also to enable any person skilled in the art to practice the disclosure, including making and using any composition and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A pearl sugar particle, comprising:
   granulated sugar;
   fine sugar, wherein the fine sugar is baker's sugar; and wherein the weight ratio of granulated sugar to fine sugar is 1.5; and
   at least one additive, wherein the at least one additive is distributed homogeneously throughout the pearl sugar particle.

2. The pearl sugar particle of claim 1 wherein the at least one additive comprises at least one of a flavoring and a coloring.

3. The pearl sugar particle of claim 1 wherein the at least one additive comprises one or more of the following: cinnamon, mint, chocolate, food coloring, liqueurs, spirits, at least one extract derived from maple, vanilla, almond, coconut, lemon, orange, cherry, anise, mint, or peppermint, a medication, a supplement, a freeze-dried food product, or a ground food product.

4. The pearl sugar particle of claim 1 wherein the pearl sugar particle has a particle size of 0.5 millimeters to 13 millimeters.

5. A composition comprising:
   a plurality of pearl sugar particles, each pearl sugar particle of the plurality of pearl sugar particles comprising granulated sugar, fine sugar, wherein the fine sugar is baker's sugar, wherein the weight ratio of granulated sugar to fine sugar is 1.5, and at least one additive, wherein the at least one additive is distributed homogeneously throughout each pearl sugar particle.

6. The composition of claim 5 wherein the at least one additive comprises at least one of a flavoring and a coloring.

7. The composition of claim 5 wherein the at least one additive comprises one or more of the following: cinnamon, mint, chocolate, food coloring, liqueurs, spirits, at least one extract derived from maple, vanilla, almond, coconut, lemon, orange, cherry, anise, mint, or peppermint, a medication, a supplement, a freeze-dried food product, or a ground food product.

* * * * *